(12) United States Patent
Steinmeyer et al.

(10) Patent No.: US 8,507,644 B2
(45) Date of Patent: Aug. 13, 2013

(54) METHOD OF MAKING A METAL TEREPHTHALATE POLYMER

(75) Inventors: Daniel Eric Steinmeyer, Chesterfield, MO (US); Jonathan Lyle Wistrom, Maryville, MO (US)

(73) Assignee: Chem Engineering Energy, Chesterfield, MO (US)

( * ) Notice: Subject to any disclaimer, the term of this patent is extended or adjusted under 35 U.S.C. 154(b) by 35 days.

(21) Appl. No.: 13/074,149

(22) Filed: Mar. 29, 2011

(65) Prior Publication Data

US 2012/0247274 A1    Oct. 4, 2012

(51) Int. Cl.
C08F 8/06       (2006.01)
C08F 8/50       (2006.01)

(52) U.S. Cl.
USPC ............................ 528/489; 528/488; 525/439

(58) Field of Classification Search
USPC ......................... 528/271, 489, 488; 525/439
See application file for complete search history.

(56) References Cited

U.S. PATENT DOCUMENTS

| | | |
|---|---|---|
| 4,952,634 A | 8/1990 | Grossman |
| 4,983,688 A | 1/1991 | Jennings et al. |
| 5,164,458 A | 11/1992 | Jennings et al. |
| 5,254,666 A | 10/1993 | Benzaria |
| 5,296,585 A | 3/1994 | Jennings et al. |
| 5,380,593 A | 1/1995 | Jennings et al. |
| 5,446,112 A | 8/1995 | Hamilton et al. |
| 5,475,045 A | 12/1995 | Baker et al. |
| 5,545,746 A | 8/1996 | Benzaria et al. |
| 6,657,077 B1 | 12/2003 | Thauront et al. |
| 6,833,485 B2 | 12/2004 | Nichols et al. |
| 6,835,861 B2 | 12/2004 | Nichols et al. |
| 7,825,213 B2 | 11/2010 | Steinmeyer et al. |
| 2009/0258993 A1* | 10/2009 | Steinmeyer et al. .......... 524/599 |

OTHER PUBLICATIONS

P. Baker and R. F. Grossman, "Properties and Reactions of Metal Terephthalates", Journal of Vinyl Technology, vol. 11, No. 2., pp. 59-61, Jun. 1989.
B. V. L'Vov, A.V. Novichikhin and A.O. Dyakov. "Mechanism of Thermal Decomposition of Magnesium Hydroxide", Thermochimica Acta, 1998, 315, pp. 135-143.

* cited by examiner

*Primary Examiner* — Ling Choi
*Assistant Examiner* — Gennadiy Mesh (57)    ABSTRACT

Methods of making metal-terephthalate polymers from a polyester ethylene terephthalate or terephthalic acid produces high yield and high purity reaction products for a range of metals. Among the preferred metal compounds employed in the processes are metal oxides and metal hydroxides. The methods are preferably carried out at a low pressure and can produce metal-terephthalate polymer powders containing small crystals which can be employed to enhance properties of polymers or disperse metals in specific applications by thermal decomposition of metal-terephthalate polymers.

3 Claims, 5 Drawing Sheets

Figure 1  PET and Calcium Hydroxide in Thermogravometric Analysis

Figure 4    TGA Analysis of Sample from Crucible Run #13 Upper Bed

FIG. 5

METHOD OF MAKING A METAL TEREPHTHALATE POLYMER

BACKGROUND OF THE INVENTION

1. Field of the Invention

The present invention relates two non-aqueous methods of making metal-terephthalate (metal-TPA) polymeric crystals. A first embodiment involves a chemical reaction between terephthalic acid (TPA) and a metal oxide, such as zinc oxide or magnesium oxide. A second embodiment involves a compound such as magnesium hydroxide or calcium hydroxide that decomposes in the general range of the melting point of polyester ethylene terephthalate (PET).

2. Description of the Art

U.S. Pat. No. 5,164,458 discloses a process for producing calcium terephthalate elongated fibers having an average particle size of about 100 mesh synthesized by an aqueous process.

U.S. Pat. No. 5,380,593 provides 9 examples of multistep aqueous based syntheses, for making calcium as well as zinc and barium terephthalate fibers. It adds the distinction that these are anhydrous fibers or rods and not hydrated plates as produced by simpler aqueous synthesis processes. The distinction is important because the hydrated plates do not function in most polymer systems because the release of water causes problems. Various sizes of the fibers are given, the smallest being 75 microns in length.

It has been known to convert used passenger vehicle tires into useful byproducts through a pyrolysis process. See generally U.S. Pat. Nos. 6,835,861 and 6,833,485. These patents disclose a process of heating the material to a temperature where the original molecules are rearranged into more stable thermal species.

U.S. Pat. No. 5,446,112 discloses a multistep synthesis strategy for making metal terephthalates resins. It begins with an aromatic monocarboxylic acid which reacts with a metal oxide. Water is then distilled off followed by a reaction with a dialkyl ester of an aromatic acid. This yields a metal-terephthalate resin and a byproduct alkyl ester. No conditions are given for the final step. The byproduct alkyl ester is distilled away in this strategy. The only information on the form and purity of the resin product is that it contains less than 10 ppm of metal halide.

U.S. Pat. No. 5,254,666 is directed toward a reaction of polyester ethylene terephthalate with metal compounds to recover terephthalic acid, as well as the polyol of the polyester. The upper limit of temperatures employed is 180° C. The temperature cited is well below the melting point of polyester ethylene terephthalate. The examples mention potassium and sodium, which are monovalent and belong to the class known as alkali metals. The patent states that the product powder is dissolved in water. The patent discloses alkaline earth metals, which are polyvalent and would include calcium and magnesium, but the fact that the product dissolved in water, shows that the product could not have been a polyvalent metal polymer as disclosed in the present invention.

U.S. Pat. No. 5,545,746 is also directed toward recovery of terephthalic acid, as well as the polyol of the polyester. The examples only mention potassium and sodium. The patent discloses dissolving the product in water which again shows that the product could not have been a polyvalent metal polymer as discussed in the present invention.

U.S. Pat. No. 7,825,213 discloses making metal-terephthalate polymer by reacting PET with at least one material selected from a group of polyvalent metal compounds in a first reaction zone, which provides a non-aqueous PET melt environment at temperatures of about 270° C. and 380° C. Subsequently, the reaction product from the first zone in the reactor is introduced into a second zone for processing at about 400° C. to 600° C. In this second zone unreacted PET and undesired byproducts are destroyed and leave the zone as vapor. The yields of metal-terephthalates reported by U.S. Pat. No. 7,825,213 are about 10% to 40%. The disclosure of U.S. Pat. No. 7,825,213 is expressly incorporated herein by reference.

A paper by P. Baker and R. F. Grossman, "Properties and Reactions of Metal Terephthalates," Journal of Vinyl Technology, Volume 11, No. 2, pp. 59-61, June, 1989 discloses the unique properties of polyvalent metal terephthalates. One unique property is their high thermal stability which results in high decomposition temperatures. Typically polyvalent metal terephthalates do not decompose until about 600° C. The paper explains this unusual stability by showing the interlinked structure of the longchain polyvalent metal terephthalate molecules. The paper also makes a sharp distinction between monovalent terephthalate salts and divalent terephthalate metals. Monovalent terephthalate salts are water soluble. Multivalent metals make a terephthalate polymer which exhibits only trace solubility. Both the high thermal stability and the insolubility in water follow from the interlinked structure.

A number of patents disclose uses of metal terephthalates. U.S. Pat. No. 4,952,634 discloses the use of polymeric polyvalent metal polycarboxylic acids such as zinc terephthalate providing a crosslinking reaction with carboxylated rubber. It also discloses decomposition temperatures for many of these metal-TPA polymers. See also U.S. Pat. Nos. 4,983,688; 5,164,458; 5,380,593; 5,446,112; and 5,475,045. All of these patents employ aqueous processing which is a fundamentally different way of producing metal-TPA than U.S. Pat. No. 7,825,213. Other patents such as U.S. Pat. No. 5,254,666 and U.S. Pat. No. 5,545,746 are directed toward recovery of terephthalic acid and polyols. They differ from U.S. Pat. No. 7,825,213 by operating at lower temperatures and use of monovalent metals such as potassium and sodium.

A paper by B. V. L'vov, A. V, Novichikhin, and A. O. Dyakov, "Mechanism of Thermal Decomposition of Magnesium Hydroxide" Thermochimica Acta, 1998, 315, 135-143 discusses the decomposition of magnesium hydroxide, and how it produces high energy vapor molecules, not simply MgO solid molecules as generally reported in the literature. This is important because the MgO vapor is much more reactive. However the paper provides no suggestion that these high energy molecules could be utilized in chemical reactions, such as those with PET or TPA.

The book by B. V. L'vov, "Thermal Decomposition of Solids and Melts", Springer (2007), tabulates the decomposition of solids more generally and gives data suggesting a decomposition temperature of approximately 262° C. for magnesium hydroxide and 297° C. for calcium hydroxide. The corresponding number for barium hydroxide is 337° C. and for strontium hydroxide is 317° C. This work suggests that a number of metal hydroxides will behave similarly to the reactions described in U.S. Pat. No. 7,825,213. However, the book itself never suggests that the decomposition could be combined with the melt temperature of PET in a way that yields metal-terephthalates. An indirect use of the decomposition data in the book is that it shows that an alternate method of synthesis will be needed to make metal-terephthalic compounds from most metals as they do not have compounds that decompose in the temperature range of the PET melting point.

In spite of the foregoing known methods, compositions and understanding shown in the art, there remains a very real and substantial need for a method of making anhydrous, metal terephthalate polymeric crystals of other metals which do not offer the synergy of decomposition temperatures with PET melt temperature. There is also a need for a method that gives higher yields. This is especially true in order to efficiently utilize the terephthalic acid content in recycled polyester ethylene terephthalate plastic.

SUMMARY OF THE INVENTION

The first embodiment of this invention takes an alternate synthesis approach while still retaining the inherent simplicity of non-aqueous synthesis, feeding both metal oxide and TPA as solids and withdrawing a solid metal-TPA product. The distinction is use of TPA as a reactant. While TPA is fed as a solid, it appears to react as a vapor at the surface of the metal oxide.

The first embodiment can also be extended to using PET feed as a terephthalic precursor instead of TPA by hydrolyzing the PET to TPA by steam injection. The first embodiment brings two advantages. First, in principle, it allows manufacture of metal-TPA containing any type of metal that produces a multivalent metal oxide. This greatly extends the range of metal which can be employed. Second, it enables manufacture of metal-TPA of a type like Zn-TPA which decomposes in the same temperature range as PET. It is contemplated that this increased range of metal-TPA might enable dispersing a wide range of metals in a wide range of applications such as employed in many catalysts.

The second embodiment combines the unique non-aqueous concept of U.S. Pat. No. 7,825,213 process with the first embodiment and takes advantage of the ability to capture TPA with a metal oxide fed to a separate reactor. The excess metal oxide is converted back to metal hydroxide by injection of steam in an intervening vessel. The result of the combination of steps is production of metal-TPA of high purity while also achieving a high yield on raw materials.

An object of the present invention is to provide methods of making metal-terephthalate polymers by a non-aqueous process that reacts polyvalent metal compounds with polyester ethylene terephthalate or terephthalic acid.

It is another object of the present invention to provide a simple process for producing a product of high yield and high purity.

It is another object of the present invention to use metal oxide solids in such a way as to capture terephthalic acid molecules.

It is a further object of the invention to produce the metal-terephthalate polymer in the form of crystals with minimum dimensions in the submicron range.

It is yet another object of the present invention to employ air to destroy undesired byproduct vapors and resist their release to the atmosphere and to use the energy released by the destruction of byproduct vapors to heat the process.

These and other objects of the invention will be more fully understood from the following detailed description of the invention on reference to the illustrations appended hereto.

DESCRIPTION OF THE PREFERRED EMBODIMENTS

As employed herein, "poly ethylene terephthalate" is an alternate designation for polyester ethylene terephthalate and "PET" is the acronym. When referencing terephthalic acid, "TPA" is the acronym. When referring to metal terephthalates the acronym uses "TPA". For example, magnesium terephthalate becomes Mg-TPA. The acronym for thermo-gravimetric analysis is similar, being TGA.

As used herein, the present invention provides two embodiments of improved methods for the production of metal terephthalate polymers employing a polyvalent metal compound to produce a metal-terephthalate polymer. If magnesium oxide is employed as the source of the metal compound, reaction (1) provides ~Mg—OO—C—$C_6H_4$—C—OO~ elements which are the building blocks for the long chain metal-terephthalate polymer. If magnesium hydroxide is employed as the metal compound, reaction (2) provides the same building block, but also splits off molecular ethylene glycol fragments.

MgO+TPA=>~Mg—OO—C—$C_6H_4$—C—OO~+$H_2O$  (1)

Mg(OH)$_2$+PET=>~Mg—OO—C—$C_6H_4$—C—OO~+
  $H_2O$+ethylene glycol fragments  (2)

The terephthalic acid molecular framework provides an aromatic central structure with carboxylic acid groups at opposite ends. The carboxylic ends can react with multivalent metals to provide metal-terephthalate polymers which are stable to surprisingly high temperatures yet are primarily made of carbon and oxygen. These metal-terephthalate polymers compounds have been useful as stiffening agents and crosslinkers in other polymer systems.

A unique feature of the methods disclosed herein is simplicity. The process operates in a non-aqueous environment, feeding two solids and producing a solid product as a result of thermal processing. These methods build on the elegant concept of solid feeds combined with solid product first described in U.S. Pat. No. 7,825,213. The primary distinction from U.S. Pat. No. 7,825,213 is addition of reaction (1) where metal oxides capture TPA produced by decomposition of PET. In one embodiment this expands the range of metals that can be used. In the second embodiment it results in much higher yield. The higher yield is also enhanced by careful mixing of PET, steam and metal components.

Because of the non-aqueous environment for both embodiments, low operating pressure, such as the range of about 5 psia to 100 psia, for example, may be employed in order to reduce the cost of production.

Fine scale of mixing contributes to obtaining a higher yield. For example, in the second embodiment, yield in excess of 85% has been achieved, when holding the mix to a stoichiometric ratio of one. Fine scale of mixing means assuring that the local ratio of solid reactants differs from the average at a given physical point by less than 1%.

Based on the prior art discussed hereinbefore, the suggested mechanism for reaction (2) is the decomposition of $Mg(OH)_2$ to make vapor molecules of MgO and water, followed by reaction of the evolved vapor with polyester ethylene terephthalate (PET), with subsequent release of ethylene glycol fragments.

In both embodiments, the long chain Mg-TPA polymer then assembles from the shorter pieces of Mg-TPA, e.g., $2\{\sim Mg\text{—}OO\text{—}C\text{—}C_6H_4\text{—}C\text{—}OO\sim\}$ becomes $\sim Mg\text{—}OO\text{—}C\text{—}C_6H_4\text{—}C\text{—}OO\text{—}Mg\text{—}OO\text{—}C\text{—}C_6H_4\text{—}C\text{—}OO\sim$.

A key method of exploring this chemistry is thermogravimetric analysis (TGA). TGA is normally an analytic device that heats a small sample of 10 to 30 milligrams in a small pan. The heating cycle can be programmed to run at different ramp rates as shown by FIG. 1. TGA can be programmed to stop the cycle at various temperatures and provide "hold times" for reactions to complete. In addition to its use as an analytical device, TGA can be used to simulate reactions that happen along the time-temperature path. Over 100 TGA runs were made to explore variables that improved yield and purity. The most significant runs are summarized hereinafter in Tables 2 through 4.

Figures 1A, 1B:
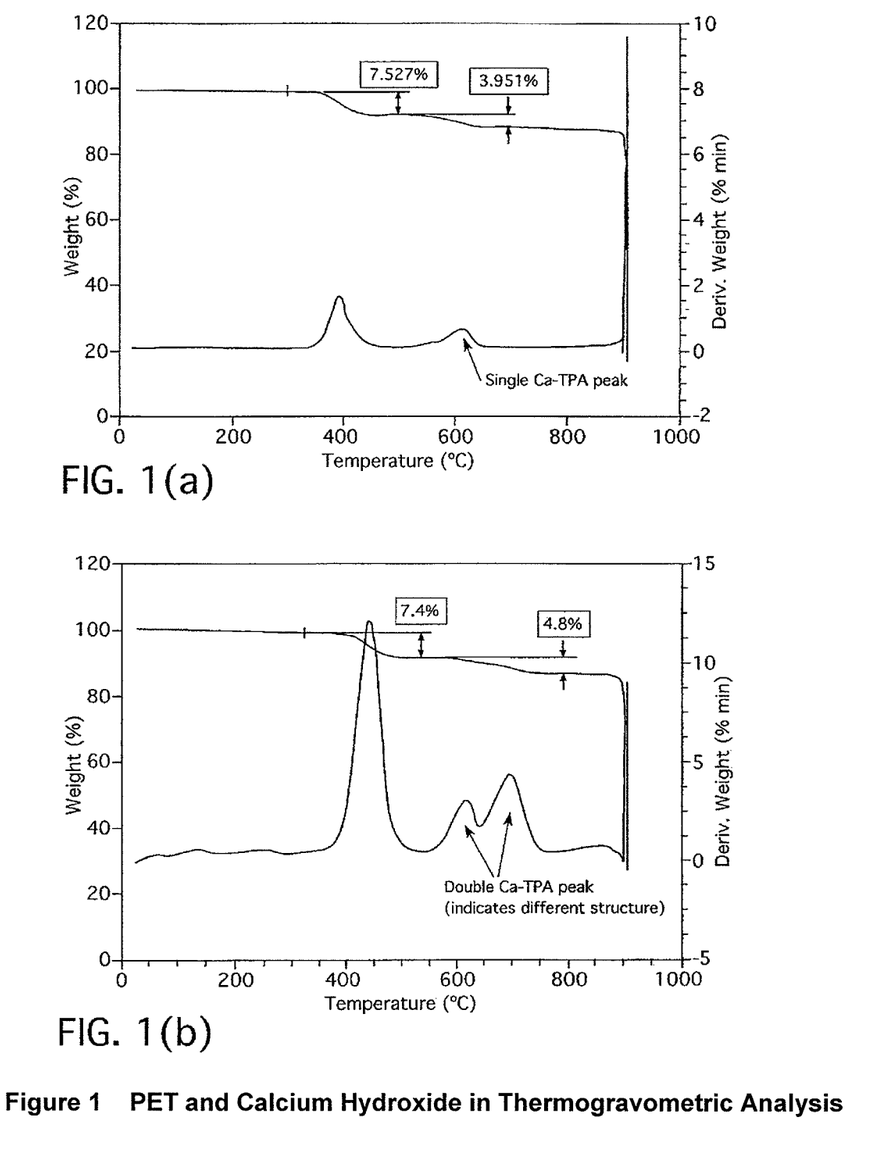
FIG. 1 illustrates the use of thermogravimetric analysis (TGA) as a way to simulate the calcium terephthalate (Ca-TPA) formation reaction.

TGA is a small scale analytic device that operates in a batch mode. However it can be used to simulate a continuous process that follows the same time versus temperature track. FIGS. 1(a) and 1(b) illustrate TGA use for chemistry exploration, in this case with $Ca(OH)_2$ and PET as feed materials. FIG. 1(a) employed a heating rate of 10° C. per minute and FIG. 1(b) employed a heating rate of 100° C. per minute. In both FIGS. 1(a) and 1(b) a high temperature peak and a low temperature peak are present.

The peak above 520° C. measures the amount of Ca-TPA that was made in the lower part of the TGA cycle. The lower temperature peak from about 350° C. to 520° C. is used to estimate unreacted PET and byproducts. The ratio of the peaks in these two zones provides a way to estimate yield.

Despite a large excess of calcium hydroxide, the yield of Ca-TPA shown by FIGS. 1(a) and 1(b) is less than 40%. This relatively low yield provided an incentive for the present invention.

Referring once again to FIG. 2, there is shown a Mixing Reactor 1. The Mixing Reactor 1 combines the solid stream 4, from the capture reactor 5a,5b with injected steam 10, and a fresh feed stream of PET 6. The capture reactor 5a,5b provides the same function as the upper bed 34 of FIG. 3 which will be discussed in connection with Table 1 and the Example. The capture reactor is shown as two vessels 5a,5b operated in tandem, but could be as many as four separate vessels in tandem, if desired.

Figure 2:
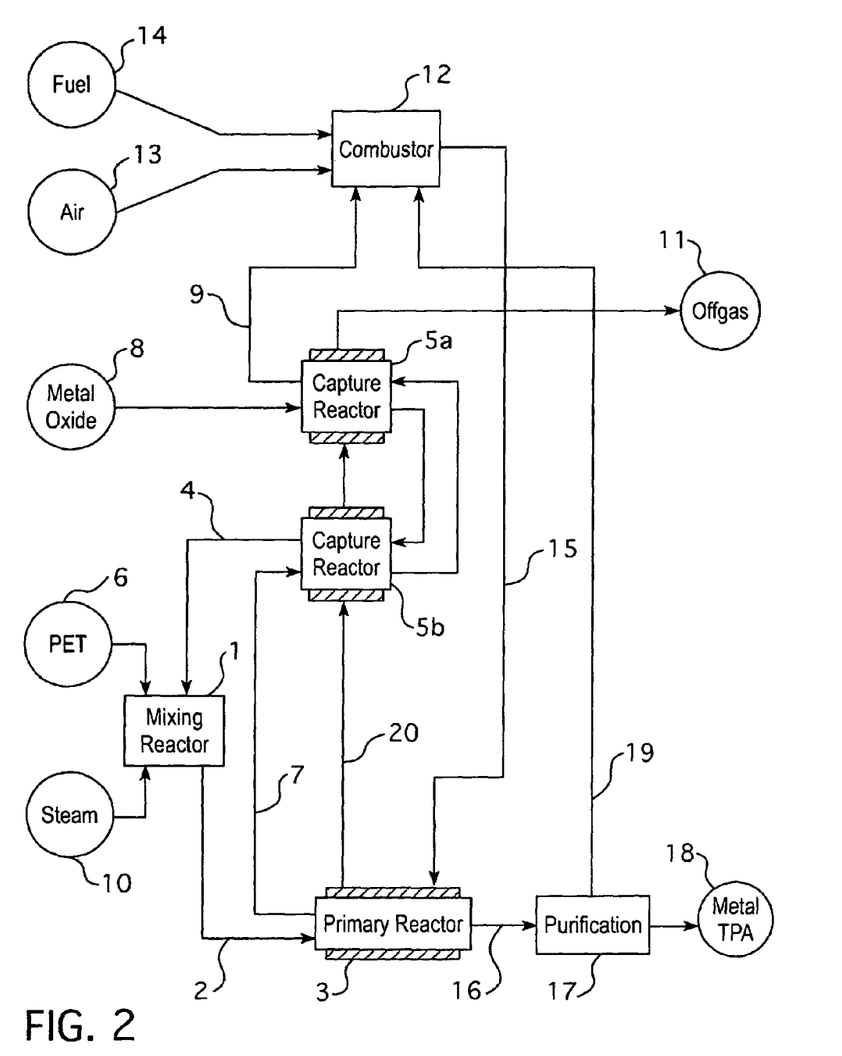
FIG. 2 is a schematic illustration of a continuous process that converts metal oxide and PET into metal TPA with a high yield while minimizing impurities.

The function of the steam, stream 10 is to convert the unreacted MgO in stream 4 to $Mg(OH)_2$. In addition to converting MgO to $Mg(OH)_2$ the Mixing Reactor 1 thoroughly mixes the materials to generate a feed 2 which is sent to the primary reactor 3. The primary reactor 3 provides the same function as the lower bed 38, and in addition raises the temperature to decompose unreacted PET. This is discussed hereinafter in connection with in Table 1 and the Example.

The addition of steam and its reaction with MgO also preheats the feed 2 before sending it to the primary reactor 3. Furthermore the mechanical energy of the injected steam is used to enhance mixing.

In the primary reactor 3 the well-mixed feed is further heated and solid PET is melted to form the solvent for the reaction. The temperature is further increased to about 400° C. and 500° C. to complete the desired reaction to make Mg-TPA.

A vapor-gas stream 7 emerges from primary reactor 3 at the feed end of the reactor and moves to the capture reactor 5a,5b. This vapor-gas stream 7, is largely water vapor from the decomposition of $Mg(OH)_2$, but it is also high in terephthalic acid (TPA) from PET hydrolysis.

The capture reactor 5a,5b contacts this vapor-gas stream with a countercurrent flow of magnesium oxide (MgO) 8. This forms additional Mg-TPA. This acts to raise the overall yield of Mg-TPA and enables a near stoichiometric feed ratio of magnesium to polyester ethylene terephthalate. The solid stream 4 from the capture reactor 5a,5b is routed to the Mixing Reactor 1. In FIG. 2, the capture reactor 5a,5b is shown as two separate beds. If desired, it could be three or more depending on the design details and on design economics. The capture reactor vessels 5a,5b contain distributors and redistributors to enhance recovery of TPA.

In FIG. 2, stream 8 the magnesium-oxide, and stream 7 essentially operate in countercurrent flow. Although the main purpose is to capture TPA, this countercurrent operation also captures water vapor contained in stream 7. This enables the size of stream 10, the injected steam, to be minimized.

The purge stream 9 that emerges from the capture reactor 5a,5b is routed to a Combustor 12. The Combustor 12 is a device for destroying light organics and carbon monoxide in the purge. The purge stream 9 also contains steam and a mix of small molecules that are evolved from the $C_2H_4$ component in polyester ethylene terephthalate. The Combustor 12, is also fed air 13 and a fuel 14, such as natural gas. The hot combusted gases 15 that leave the Combustor 12 are primarily nitrogen, $H_2O$ and $CO_2$. They are routed through jackets on the outside of the primary reactor 3 and by flow to the capture reactor 5a,5b for heat recovery before being discharged to the atmosphere as Offgas stream 11.

The unpurified metal terephthalate product stream 16 emerges from the opposite end of the primary reactor 3 from the entry point of the feed stream 2. This unpurified intermediate product 16 is sent to the purification system 17. The purification system will vary depending on the level of contaminants desired in the final product, (metal-TPA) stream 18, but will generally require the removal of the light ends stream 19. The light ends are primarily derived from the $C_2H_4$ component in PET. They are routed to the Combustor 12 in FIG. 2.

While TGA is useful for exploring a wide range of variables, it is generally limited by its small size and its inability to handle a more complex system like that shown in FIG. 2. The TGA device also cannot produce large samples for application testing or imaging.

To remedy this, additional work was done in a 1.5 inch diameter crucible contained in an electrically heated enclosure called a "muffle furnace". This is conceptually similar to the TGA, but much larger in scale. The reactant charge was roughly 1000 times as great as in the TGA runs. The enclosing muffle furnace can be described as an insulated 8 inch cube. Five of the sides have electrical heaters behind them. The sixth side is the door.

Figure 3:
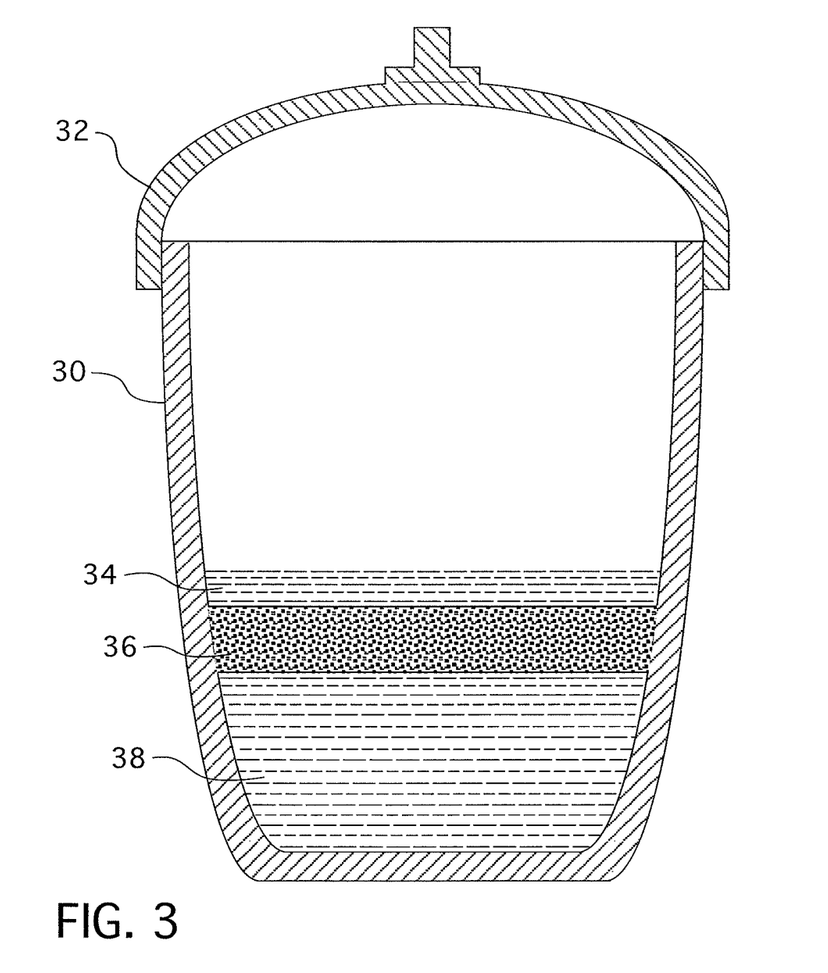
FIG. 3 shows a representation of the crucible used in the batch crucible Run #13 that formed the basis for the embodiments discussed herein.

FIG. 3 shows a crucible used in Run #13 which formed the basis for FIG. 2. FIG. 3 shows a crucible body which may be made of any suitable material well-known to those skilled in the art. An overlying, loosely fitted lid 32 cooperates with the crucible body to create a crucible chamber. An upper bed 34 which in the specific test was MgO overlies a layer of glass wool filter 36 under which is the lower bed 38 which comprises in the test described $Mg(OH)_2$ and PET.

Table 1 summarizes the crucible Run #13. More discussion is also given in the Example. This run demonstrated the concepts underlying both embodiments of the invention and simulated the continuous process shown in FIG. 2.

More specifically in Run #13, the upper bed 34 simulated the capture reactor 5a,5b shown in FIG. 2 and the lower bed 38 simulated the lower temperature reactions that occur in the primary reactor 3 shown in FIG. 2. Insertion of a ¼ inch thick glass wool filter 36 was the innovation that enabled the crucible Run #13 to operate with the two distinct beds. Escaping vapors from the lower bed 38 rose up through the glass wool 36 into the upper bed 34.

TABLE 1

Crucible Run Simulating Two Countercurrent Beds Making Mg-TPA Crucible Run 13

| | |
|---|---|
| Heating cycle | 20 minutes with muffle at 300° C. |
| | 60 minutes with muffle at 355° C. |
| | 20 minutes with muffle at 375° C. |
| | 30 minutes with muffle at 450° C. |
| Relative Charge of Reactants | |
| Upper bed | 1 mole of MgO |
| Lower bed | 1 mole Mg(OH)$_2$ and 1 mole PET |
| | (1 mole of PET is defined as the mass containing one TPA mole) |
| Mg-TPA Yield | |
| Upper bed | 14% |
| Lower bed | 71% |
| Total | 85% |

In the upper bed 34 the key reaction is (1). In the lower bed 36 the key reaction is (2). The main distinction between this run and FIG. 2 is that the crucible run is a batch operation and FIG. 2 is a continuous process designed on this data. The upper bed 34 demonstrated the concept of the capture reactor 5a,5b shown in FIG. 2. The lower bed 38 demonstrated the concept of the lower temperature part of the primary reactor 3 shown in FIG. 2. The stoichiometry was chosen to simulate a condition where the capture reactor 5a,5b solids would flow to the primary reactor 3 as shown in FIG. 2. The heating cycle was chosen to provide adequate heat transfer into the static lower bed 38. The continuous process shown in FIG. 2 will have a somewhat different time at temperature cycle. The important elements in this cycle are providing a molten PET for the decomposing metal hydroxide to react with. The primary intent of crucible Run #13 was to demonstrate that high yield of Mg-TPA could be obtained at a stoichiometric molar ratio of metal compound and PET.

Multiple samples were taken from the upper bed 34 and lower bed 38 of crucible Run #13 and fed to the TGA. The TGA runs perform two functions. First they define the condition of the reactions in the two beds at the end of the cycle, especially the amount of Mg-TPA made in each bed. The second function is defining the purity of the Mg-TPA that was made by raising the temperature through the range where the Mg-TPA is decomposed.

Figure 4:
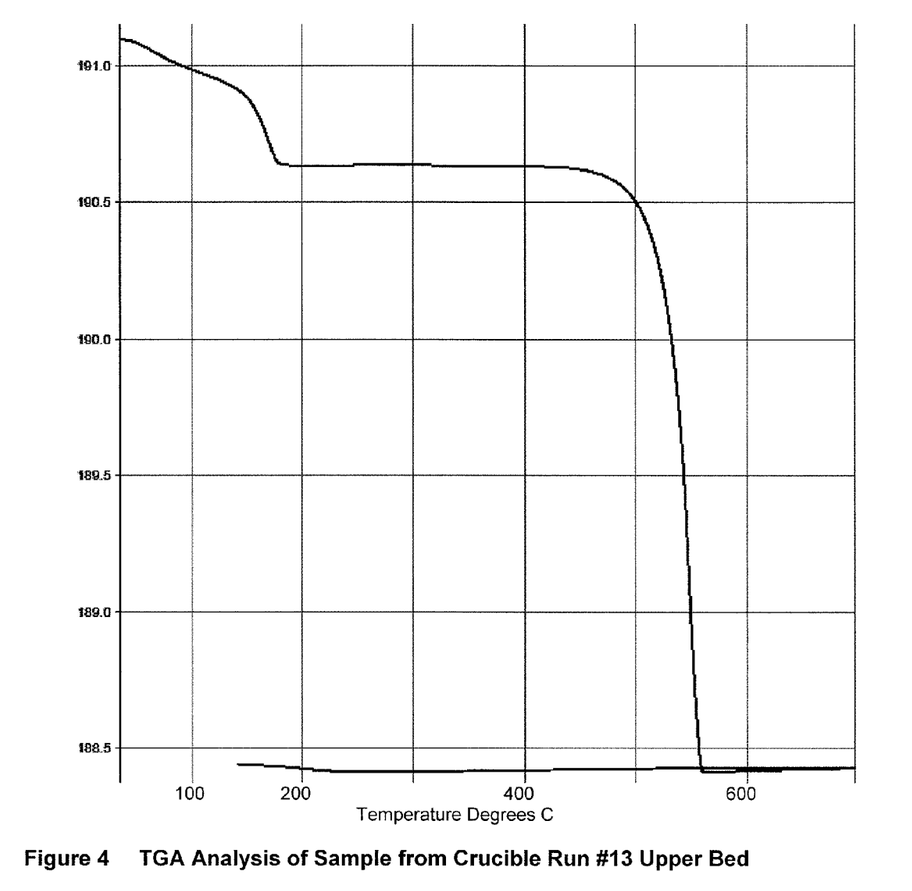
FIGS. 4 and 5 show, respectively, TGA analyses of the upper bed and lower bed in crucible Run #13 of FIG. 3.

FIG. 4 shows the analysis of one of the samples produced in the upper bed. The vertical axis is the combined mass in grams of the TGA pan and sample over the course of the TGA analysis.

The weight loss between 520° C. and 600° C. ratioed to the weight in the residue enabled calculation of yield. The values given in Table 1 are averages of several samples.

The high fractional capture in the small depth of the upper bed 34 shown in FIG. 3 suggested the addition of a second capture reactor 5b in the process shown in FIG. 2. This is expected to raise the overall yield of the system to above 90%. The optimum system may involve three or more separate capture beds.

The weight loss shown by FIG. 4 at temperatures below 170° C. is mostly water. This water capture is important in reducing the amount of steam needed to be added between the capture reactor 5a,5b and the primary reactor 3 (FIG. 2). The fractional capture of water could be increased by raising pressure, and lowering temperature. For example, pressure in the system could be raised to 100 psi and the exiting temperature of the vapor stream 9 from the vessel 5b could be lowered to the feed temperature of stream 8 by eliminating the heating jacket.

Figure 5:
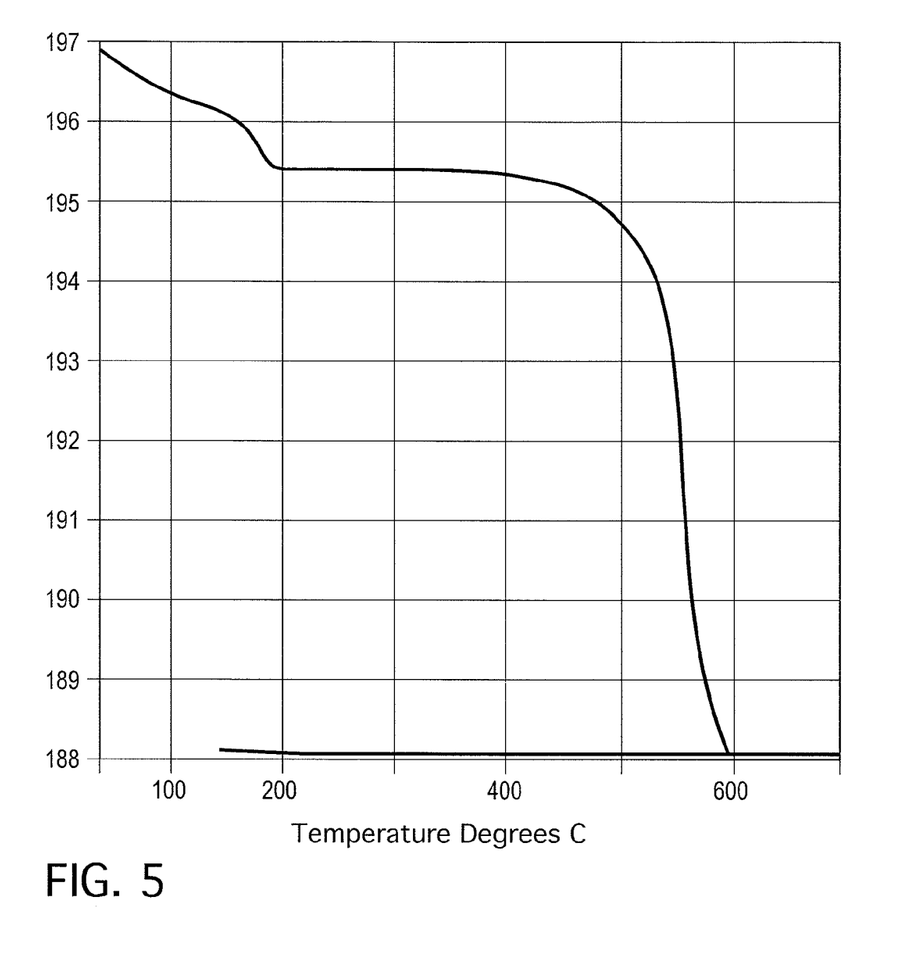

FIG. 5 shows the analysis of material produced in the lower bed 36. This bed reacted Mg(OH)$_2$ with PET. The lower bed 38 when operated at the temperature near 450° C., which the crucible Run #13 reached at the end of its cycle, decomposes residual PET to TPA and byproducts. The weight loss in grams in FIG. 5 between 400° C. and 520° C. represents the breakdown of this unreacted PET.

The capture reactors 5a,5b (FIG. 2) function in the manner of upper bed 34 (FIG. 3) in the batch test. The primary reactor 3 functions as did lower bed 38 in the batch test.

The primary reactor 3 (FIG. 2) reaches a higher temperature than that reached by crucible Run #13. Thus the TGA in FIG. 5 simulates the higher temperature portion of the primary reactor 3. The relatively abrupt finish to the weight loss curves in both FIG. 4 and FIG. 5 shows that the product Mg-TPA is relatively pure.

The high overall yield shown in Table 1 is due to a combination of factors, including efficient capture of the TPA evolved from the lower bed 38, good mixing of reactants, the control of temperature profile, the slightly greater depth of reactants than in the TGA. There are factors which are expected to further increase this yield such as addition of more beds for capture of TPA.

The relatively high efficiency of the TPA capture by the upper bed 34 in crucible Run #13 (FIG. 3) led to recognition that reaction (1) could be used as a separate synthesis approach. In this invention, this separate synthesis approach is designated as the first embodiment.

Other divalent metal oxides have similar reactions with TPA as that shown by reaction (1). The reaction for zinc oxide is shown by reaction (3).

$$ZnO+TPA =>\sim Zn-OO-C-C_6H_4-C-OO\sim +H_2O \qquad (3)$$

For manufacture of Zn-TPA, the reaction of oxide with TPA is preferred over the reaction of zinc hydroxide with PET because it avoids the difficulty of Zn-TPA decomposing in the same temperature range as PET.

Table 2 shows that essentially the same yield was obtained for zinc oxide as for magnesium oxide when the stoichiometry was the same, i.e., over 40% yield. Both sets of data are for a premixed sample run in the TGA. The yield is based on the maximum TPA that evolves from PET.

TABLE 2

TGA Runs on TPA with Zn and Mg Oxides

| Zn-TPA Yield Based on max TPA from PET | |
|---|---|
| 41% | 4 moles of ZnO per mole of TPA |
| Mg-TPA Yield Based on max TPA from PET | |
| 43% | 4 moles of MgO per mole of TPA |
| 18% | 2 moles of MgO per mole of TPA |
| 11% | 1 mole of MgO per mole of TPA |

Zn-TPA is expected to be useful in the rubber industry where zinc compounds are commonly employed.

Most of the synthesis work was done with PET and $Mg(OH)_2$ and $Ca(OH)_2$. Somewhat higher yields were found than for the reaction of metal oxides and TPA as shown by a comparison of Tables 3 and 4 to Table 2 with some TGA yields exceeding 70%.

TABLE 3

TGA Runs on $Ca(OH)_2$ and PET
Ca-TPA Yield Based on max TPA from PET

| Based On Weight Loss In Ca-TPA Temp Decomposition Range | Based On Weight Loss At Lower Temp | |
|---|---|---|
| 78% | 70% | 4 moles of $Ca(OH)_2$ per mole of TPA |
| 44% | 45% | 2 moles of $Ca(OH)_2$ per mole of TPA |
| 38% | 26% | 1 mole of $Ca(OH)_2$ per mole of TPA |

Ca-TPA decomposition begins in the range of about 500° C. to 550° C. as indicated by the break in weight loss curve in FIGS. 1(a) and 1(b). The range depends on the specific nature of the TGA operation.
The temperature range of unreacted PET begins at about 380° C. and extends to the break in weight loss curve above 500° C..
The two ways of estimating yields are in substantial agreement, which supports the use of TGA for yield estimation. The value of the first column is believed to be more accurate and used in Table 4.

TABLE 4

TGA Runs on $Mg(OH)_2$ and PET
$Mg(OH)_2$-TPA Yield Based on Weight
Loss in Mg-TPA Decomposition Range

| ~75% average | 4 moles of $Mg(OH)_2$ per mole of TPA |
| ~45% average | 2 moles of $Mg(OH)_2$ per mole of TPA |
| ~40% average | 1 mole of $Mg(OH)_2$ per mole of TPA |

The Mg-TPA decomposition starts in the range of about 500° C. to 550° C. as indicated by the break of the weight loss curve in FIGS. 4 and 5. The range depends on specific TGA operation.

The higher yields in Tables 3 and 4 compared to Table 2 are believed to result from the characteristic decomposition of $Ca(OH)_2$ and $Mg(OH)_2$ into high energy vapor molecules of metal oxide and $H_2O$. The speed of reaction (2) is illustrated by the fact that the runs made with only about 5 or 10 minutes hold time gave essentially the same yields as much longer hold times. While this type of reaction was only demonstrated for $Ca(OH)_2$ and $Mg(OH)_2$, it is expected to work equally well for any metal compound that decomposes in the range close to the PET melt point of about 250° C. to 350° C. The compounds most tested, $Ca(OH)_2$ and $Mg(OH)_2$, decompose in this range, with $Ca(OH)_2$ decomposing at approximately 300° C. and $Mg(OH)_2$ decomposing at approximately 260° C. Reaction (2) should be useful for making metal-TPA for barium, strontium, cadmium and lead because of the existence of metal compounds that decompose in the range of the PET melt point. It is also anticipated that Fe-TPA and Al-TPA can be made this way.

Yield on PET can be increased by running with excess $Ca(OH)_2$ and $Mg(OH)_2$ as shown by Tables 3 and 4. However yield increase by this approach is less desirable than by the embodiment shown in FIG. 2 because high ratios of metal to PET reduce purity of the metal-TPA and also increase cost due to the extra metal compound.

For many other metals such as chromium, molybdenum, tungsten, uranium, cobalt, nickel, antimony and bismuth the first embodiment which uses TPA feed along with metal oxide is the preferred synthesis route.

As many of these metals have catalytic properties, it would be useful to present them to the catalytic formation recipe in a form that will decompose in the high temperature range common to metal-TPA. These may vary from a low of 430° C. to a high of 640° C. See U.S. Pat. No. 4,952,634.

The defined decomposition temperatures for metal-TPA polymers may also prove useful for incorporating these metals into other products where the metals can provide special properties such as flame retardancy, thermal stability, chemical stability and abrasion resistance.

While TGA is an efficient tool for exploratory chemistry, it operates with feeds in the range of 0.01 gram to 0.03 gram. In order to generate more realistic data, a few larger scale runs were made using crucibles filled with between 10 grams and 30 grams. Table 5 show yields from several crucible runs. The yields are somewhat higher than in Table 4 for comparable feed ratios. This is believed to be due to the greater depth of material in the crucible which enabled greater contribution from reaction (1).

TABLE 5

$Mg(OH)_2$ and PET Crucible Runs Compared to TGA Runs

| $Mg(OH)_2$ PET | Yields on PET in Crucible | Yields on PET in TGA |
|---|---|---|
| 2 | 90% | 45% |
| 1 | 45% | 40% |

Both the crucible and TGA runs were made in a batch mode. The major difference between the crucible and TGA runs is that the much larger mass of reactants in the crucible results in a greater depth of material which enables enhanced capture of the escaping TPA vapor from the MgO that was created when $Mg(OH)_2$ decomposed. This data shows that the difference is much greater for runs with excess $Mg(OH)_2$. This is due to the increased depth of the crucible increasing the benefit.

The pursuit of higher yield led to the concept of the two bed crucible system employed in crucible Run #13 discussed in Table 1 and the Example. This crucible run utilized two beds that were different in composition and employed different chemistry. The upper bed behaved as batch reactor utilizing reaction (1) and the lower half behaved as a batch reactor utilizing reaction (2). This batch crucible run formed the basis for the continuous process shown in FIG. 2.

It will be obvious to one skilled in the art that there may be many variants of this process. For example, air can be injected directly into the primary reactor 3 (FIG. 2) to supply heat and strip light ends from the intermediate product. Steam can also be added to the primary reactor 3 to facilitate recovery of TPA. Variations can be also be introduced by choice of system pressure over the range of about 5 psia to 100 psia. Lower pressure facilitates recovery of TPA from the primary reactor 3 and higher pressure facilitates capture of TPA in the capture reactor 5a,5b. Similarly the choice of temperatures for the various reactors can be utilized to improve yield.

A suitable source of polyester ethylene terephthalate for embodiment two can be obtained from recycled PET bottles or PET fiber or from virgin sources.

Similarly TPA for embodiment one, can be obtained by purchase as it is a commodity chemical, or it can be obtained by steam hydrolysis of recycled PET. When PET is hydrolyzed by steam to produce TPA, the PET can be described as a TPA precursor.

EXAMPLE

This example is based on Crucible Run #13 demonstrating yield benefit of process using two distinct beds, with the upper bed 34 fed MgO and capturing TPA that evolved from the lower bed 38, which was fed PET and Mg(OH)$_2$.

The Example is taken from crucible Run #13 (FIG. 3), the results of which are shown in Table 1. This batch experiment, run in the vessel shown in FIG. 3, when combined with the TGA analysis shown by FIGS. 4 and 5, demonstrated the concepts embodied in the continuous process illustrated in FIG. 2. In this experiment, 4.005 grams of PET were mixed with 1.223 grams of Mg(OH)$_2$ and the mix was added to crucible 32. A 0.25 inch thick quartz wool filter 36 was placed over the mix and 0.836 grams of MgO were added above the quartz wool filter. The crucible was heated for a total of 130 minutes in a muffle furnace at the rising temperature profile described in Table 1. Final muffle furnace temperature was 450° C. The quantities were such that a mole of Mg(OH)$_2$ was present in the bottom bed 38 for each mole of TPA contained in the PET, and similarly a mole of MgO was present in the upper bed 34 for each mole of TPA contained in the lower bed.

The material below the quartz filter 36 is described as the lower bed 38 and simulates the primary reactor 3 of FIG. 2, and the material above the quartz filter 36 is described as the upper bed 34 and simulates the capture reactor 5a,5b of FIG. 2. See FIG. 3 which shows the configuration used in crucible Run #13. The combination of these, when operated together, enables high yield of Mg-TPA with a relatively low molar ratio of Mg per mole of PET. If the MgO from the upper bed had been withdrawn and converted to Mg(OH)$_2$ by addition of steam and then put into to the lower bed, the molar ratio would have been approximately one.

Samples were withdrawn from several points in both of the beds 34,38 after the heating cycle was completed and the samples were analyzed by the TGA. Yields were calculated based on the ratio of weight loss above 520° C., as found in the TGA divided by residual weight left after the TGA cycle was completed. This ratio was multiplied by 0.27 to adjust for differences in molecular weight. The 0.27 value is based on Mg-TPA splitting off a 148 molecular weight fragment and assumes that all the residual weight is MgO. Although the crucible run only goes to 450° C., the TGA takes the temperature higher, up through the range where the Mg-TPA decomposes.

FIG. 4 shows one sample taken from the upper bed 34 of the crucible 32 and analyzed by the TGA. FIG. 5 shows a sample taken from the lower bed 38. Both figures show similar patterns of weight loss. The FIG. 5 weight loss curve shows that lower bed 38 product content is primarily Mg-TPA. The combination of the samples, gave a combined capture of 85% of the TPA evolved from the PET fed to the lower bed 38.

The high combined yield achieved by the example shows that this Mg-TPA process can operate with essentially one mole of magnesium per mole of PET and still achieve high yields. This results in a product with low levels of Mg contaminant. High yield on both components is also important from an economic standpoint.

While this Example primarily focuses on the second embodiment, which is a combination process that takes advantage of molten PET reacting with Mg(OH)$_2$, it also demonstrates the first embodiment with generation of TPA as vapor and recovery of this TPA by contact with magnesium oxide in the upper bed.

Whereas particular embodiments of the invention have been described herein for purposes of illustration, it will be evident to those skilled in that art that numerous variations of the details may be made without departing from the invention as set forth in the appended claims.

What is claimed is:

1. A method of making solid metal-terephthalate polymers comprising reacting terephthalic acid vapor (TPA) with stoichiometric excess of at least one solid polyvalent metal oxide compound selected from a group consisting of ZnO, MgO, and CaO, in at least one capture bed reactor operated below the decomposition temperature of the said solid metal-terephthalate polymer, wherein said terephthalic acid vapor obtained in a separate reactor by decomposition of polyethylene terephthalate under action of at least one polyvalent metal oxide compound and steam at elevated temperature, and wherein a total yield with respect to metal-terephthalate polymer is at least 85%.

2. The method of claim 1, wherein the yield with respect to metal-terephthalate polymer of greater than 85% as a result of adding more capture bed reactors to capture vapors of terephthalic acid.

3. The method of claim 1, wherein delivering of terephthalic acid vapor to capture bed reactors arranged in counter-current flow to the flow of said at least one solid polyvalent metal oxide.

* * * * *